(12) United States Patent
Banba et al.

(10) Patent No.: US 12,109,556 B2
(45) Date of Patent: Oct. 8, 2024

(54) FUNCTIONAL STRUCTURE

(71) Applicants: NATIONAL UNIVERSITY CORPORATION HOKKAIDO UNIVERSITY, Sapporo (JP); FURUKAWA ELECTRIC CO., LTD., Tokyo (JP)

(72) Inventors: Yuichiro Banba, Tokyo (JP); Kaori Sekine, Tokyo (JP); Yukako Nakai, Tokyo (JP); Mai Nishii, Tokyo (JP); Masayuki Fukushima, Tokyo (JP); Sadahiro Kato, Tokyo (JP); Hirokazu Sasaki, Tokyo (JP); Shinsuke Nishida, Tokyo (JP); Takao Masuda, Sapporo (JP); Yuta Nakasaka, Sapporo (JP); Takuya Yoshikawa, Sapporo (JP)

(73) Assignees: NATIONAL UNIVERSITY CORPORATION HOKKAIDO UNIVERSITY, Sapporo (JP); FURUKAWA ELECTRIC CO., LTD., Tokyo (JP)

( * ) Notice: Subject to any disclaimer, the term of this patent is extended or adjusted under 35 U.S.C. 154(b) by 557 days.

(21) Appl. No.: 17/299,641

(22) PCT Filed: Dec. 3, 2019

(86) PCT No.: PCT/JP2019/047291
§ 371 (c)(1),
(2) Date: Feb. 10, 2022

(87) PCT Pub. No.: WO2020/116468
PCT Pub. Date: Jun. 11, 2020

(65) Prior Publication Data
US 2022/0161239 A1    May 26, 2022

(30) Foreign Application Priority Data
Dec. 3, 2018  (JP) ................ 2018-226924

(51) Int. Cl.
*B01J 29/03* (2006.01)
*B01J 23/745* (2006.01)
(Continued)

(52) U.S. Cl.
CPC ......... *B01J 29/0308* (2013.01); *B01J 23/745* (2013.01); *B01J 35/40* (2024.01); *B01J 35/50* (2024.01)

(58) Field of Classification Search
CPC ........ B01J 29/03; B01J 29/0333; B01J 29/89; B01J 29/0308; B01J 29/0316;
(Continued)

(56) References Cited

U.S. PATENT DOCUMENTS

| 2003/0109383 A1 | 6/2003 | Koike et al. |
| 2011/0000824 A1 | 1/2011 | Zhan et al. |

(Continued)

FOREIGN PATENT DOCUMENTS

| CN | 103889577 A | 6/2014 |
| CN | 105358251 A | 2/2016 |

(Continued)

OTHER PUBLICATIONS

Chen et al. "Thermal and hydrothermal stability of framework-substituted MCM-41 mesoporous materials", Microporous Materials 12 (1997), 323-330.*

(Continued)

*Primary Examiner* — Stefanie J Cohen
(74) *Attorney, Agent, or Firm* — Oblon, McClelland, Maier & Neustadt, L.L.P.

(57) ABSTRACT

A functional structure which can suppress functional degradation of a functional material to achieve longer life, which can save resources without complicated replacement operations, and which, used for example as a catalyst, exhibits excellent catalytic activity. The functional structure
(Continued)

includes supports each having a porous structure and including a zeolite-type compound, and at least one functional material present in the supports and including a metal element (M), in which each of the supports has channels communicating with one another, the functional material is present at least in the channel of each of the supports, and the metal element (M) having constituted the functional material is partially substituted with an element having constituted the supports.

17 Claims, 4 Drawing Sheets

(51) Int. Cl.
  *B01J 35/40* (2024.01)
  *B01J 35/50* (2024.01)

(58) Field of Classification Search
  CPC .... B01J 29/0341; B01J 29/041; B01J 29/042; B01J 29/044; B01J 29/045; B01J 2229/14; B01J 2229/18; B01J 2229/183; B01J 35/023; B01J 35/026; B01J 35/1061; B01J 37/0201; B01J 23/70; B01J 23/745; C07C 2529/035; C07C 2529/068; C07C 2529/072; C07C 2529/076
  USPC .......................................................... 502/74
  See application file for complete search history.

(56) References Cited

U.S. PATENT DOCUMENTS

| | | |
|---|---|---|
| 2016/0030934 A1 | 2/2016 | Zhan et al. |
| 2016/0137516 A1 | 5/2016 | Kegnæs et al. |

FOREIGN PATENT DOCUMENTS

| | | | |
|---|---|---|---|
| EP | 3 632 550 A1 | | 4/2020 |
| JP | 2016-64407 A | | 4/2016 |
| JP | 2016-529190 A | | 9/2016 |
| JP | 2017-128480 A | | 7/2017 |
| JP | 2018-202411 A | | 12/2018 |
| WO | WO 2010/097108 A1 | | 9/2010 |
| WO | WO 2013/057319 | * | 4/2013 |
| WO | WO 2013/057319 A2 | | 4/2013 |
| WO | WO 2015/001123 A1 | | 1/2015 |
| WO | WO 2018/221690 A1 | | 12/2018 |

OTHER PUBLICATIONS

Abdollahi-Alibeik et al., "Cu-MCM-41 nanoparticles: An efficient catalyst for the synthesis of 5-substituted 1 H-tetrazoles via [3+2] cycloaddition reaction of nitriles and sodium azide", J. Chem. Sci. vol. 128, No. 1, 2016, 93-99.*

Werner, "In-Situ Spectroscopic Measurements of Laser Ablation-Induced Splitting and Agglomeration of Metal Nanoparticles in Solution", J. Phys. Chem. C 2008, 112, 16801-16808.*

International Search Report issued on Feb. 25, 2020 in PCT/JP2019/047291 filed on Dec. 3, 2019, 3 pages.

Laprune, D. et al., "Highly Dispersed Nickel Particles Encapsulated in Multi-hollow Silicalite-1 Single Crystal Nanoboxes: Effects of Siliceous Deposits and Phosphorous Species on the Catalytic Performances," ChemCatChem, vol. 9, No. 12, 2017, pp. 2297-2307, 12 total pages.

Combined Chinese Office Action and Search Report issued Feb. 8, 2023 in Patent Application No. 201980078004.2 (with English machine translation), 21 pages.

Extended European Search Report issued Feb. 22, 2023 in European Patent Application No. 19893994.4, 11 pages.

Chengyi Dai, et al., "Hollow zeolite encapsulated Ni—Pt bimetals for sintering and coking resistant dry reforming of methane," Journal of Materials Chemistry A, vol. 3, XP055336366, 2015, 9 pages.

Nikolay Kosinov, et al., "Engineering of Transition Metal Catalysts Confined in Zeolites," Chemistry of Materials, vol. 30, XP055506602, 2018, pp. 3177-3198.

* cited by examiner

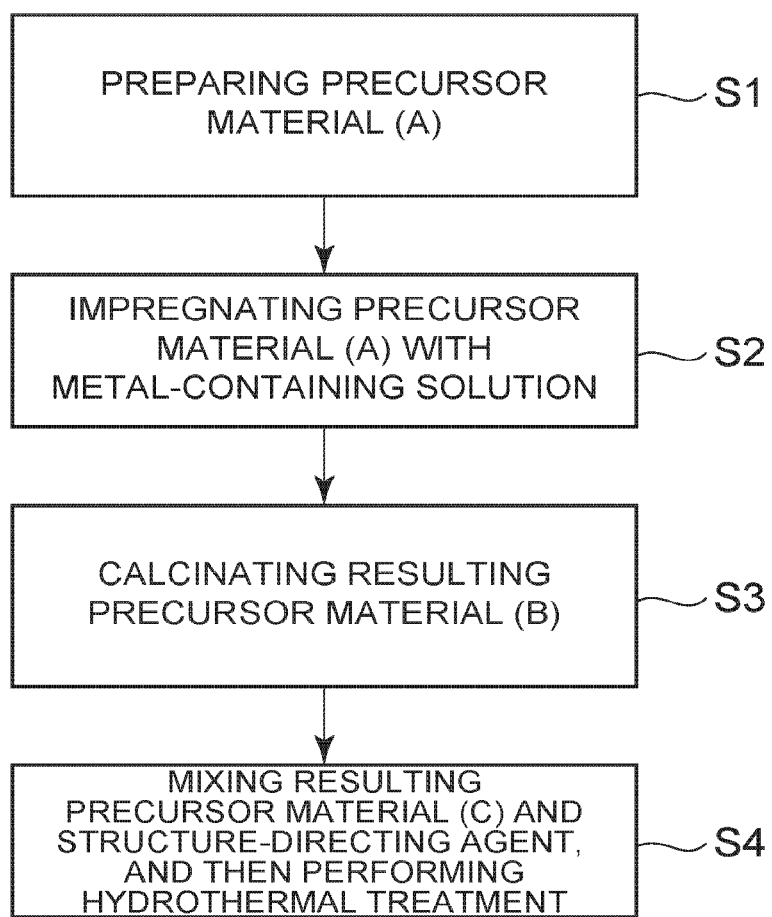

FUNCTIONAL STRUCTURE

TECHNICAL FIELD

The present invention relates to a functional structure including supports (frameworks) with a porous structure and a functional material.

BACKGROUND ART

In a petrochemical complex, an oil refinery produces, from crude oil, a petrochemical raw material called naphtha and various fuels such as heavy oil, light oil, kerosene oil, gasoline, and LP gas. Crude oil, which is a mixture including the petrochemical raw material, the various fuels, and various impurities, needs to be subjected to a distillation process and a separation process for obtaining each component contained in crude oil.

The petroleum refining process heats crude oil at a plate column in an atmospheric distillation unit to separate components based on differences in the boiling point of the components, and concentrates each of the separated components. In this process, low boiling point materials such as LP gas and naphtha are removed at an upper plate column of the atmospheric distillation unit, and high boiling point materials such as heavy oil are removed at a bottom of the atmospheric distillation unit. Each separated and concentrated material is then subjected to a secondary process such as desulfurization so that various fuel products are obtained.

In general, the petroleum refining process uses a petroleum reforming catalyst to efficiently reform low boiling point materials such as naphtha into high octane number products such as gasoline. The naphtha fraction in crude oil is low octane number and is not suitable as gasoline for vehicles. The petroleum reforming catalyst is used to reform the paraffin and naphthene components with low octane number in the naphtha fraction into aromatic components with high octane number for the production of reformed gasoline with properties suitable for vehicle fuels.

The production of heavy oil from crude oil is followed by a process that includes subjecting the heavy oil to hydrodesulfurization using a hydrodesulfurization unit such as a direct or indirect sulfurization unit to obtain desulfurized heavy oil, desulfurized heavy gas oil, or the like, and then hydrocracking the desulfurized heavy oil, the desulfurized heavy gas oil, or the like to increase the production of desulfurized naphtha, desulfurized kerosene oil, desulfurized light oil, and so on. For example, atmospheric distillation residue oil is subjected to hydrocracking to increase the yield of the desulfurized kerosene oil fraction, the desulfurized light oil fraction, and the desulfurized naphtha fraction and to decrease the yield of the desulfurized heavy oil, and the desulfurized heavy oil is fed to a catalytic cracking unit to produce the LPG fraction, the FCC gasoline fraction, and the LCO fraction, so that the residual oil is decreased while the light oil fraction is increased. Catalysts proposed for this process include a catalyst having a crystalline aluminosilicate support which is typical zeolite, and a hydrocracking catalyst including zeolite and porous inorganic oxide at a prescribed ratio.

For example, a hydrocracking catalyst is disclosed (see Patent Document 1), which includes a support made of Y zeolite; and a metal material selected from Pd, Pt, Co, Fe, Cr, Mo, W, and mixtures thereof, which is deposited on the surface of the support.

In the field of automobiles, an exhaust-gas catalyst structure for diesel engine vehicles is proposed, which is a ceramic catalyst body using a ceramic support on a surface of a substrate ceramic and prepared by supporting a main catalyst component and a sub catalyst component on the ceramic support. In the ceramic catalyst body, the surface of the ceramic support made of γ-alumina has a large number of pores including lattice defects and so on in the crystal lattices, and the main catalyst component such as Ce—Zr or Pt is directly supported on or near the surface of the ceramic support (see Patent Document 2).

Patent Document 1: U.S. Published Patent Application Publication, No. 2016/0030934, Specification
Patent Document 2: U.S. Published Patent Application Publication, No. 2003/0109383, Specification
Patent Document 3: Japanese Unexamined Patent Application, Publication No. 2017-128480
Patent Document 4: PCT International Publication No. WO2010/097108

DISCLOSURE OF THE INVENTION

Problems to be Solved by the Invention

Unfortunately, in the catalyst structure mentioned above, the catalyst particles supported on or in the vicinity of the surface of the support can easily move in the support and undergo aggregation (sintering) due to an influence, such as force or heat, from a fluid material being reformed in the reform process. The aggregation of the catalyst particles causes a decrease in the effective surface area of the catalyst, which leads to a decrease in the catalytic activity and thus makes the life of the catalyst shorter than usual. This requires the catalyst structure to be replaced or refreshed at short time, which raises problems such as complicated replacement operation and failure of resource-saving. In general, petroleum reforming catalysts are attached to the downstream side of an atmospheric distillation unit and are used continuously in the petroleum refining process. Such catalysts are difficult to subject to a reactivation technique, and even if they can be subjected to a reactivation technique, its operation would be very complicated. Suppression or prevention of an aging deterioration in such function is a task to be addressed not only in the field of catalysts but also in other many technical fields, and there is a demand for a solution for long-term maintenance of function. For practical use, it is required to have further improved catalytic activity. For example, Patent Documents 3 and 4 disclose a technique for preventing catalyst aggregation, which includes preparing amorphous silica-coated metal fine particles using an emulsion technique, and then hydrothermally treating the particles to incorporate metal fine particles into zeolite. The emulsion technique to prepare the amorphous silica-coated metal fine particles includes mixing a surfactant and a metal source in an organic solvent to form an emulsion, adding a reducing agent to the emulsion to form metal fine particles, and then adding a silane coupling agent to the emulsion to form a silica layer on the surface of the metal fine particles. Unfortunately, when the metal particles are prepared by such an emulsion technique, the size of the resulting particles is affected by the size of the droplets formed during the emulsion forming process and by the tendency of the metal particles to aggregate. In general, base metals can hardly remain in a nanoparticle size. In fact, Patent Documents 3 and 4 only show nanosized noble metal particles and do not disclose nanosized particles of any base metal or any oxide of the base metal that is vulnerable to aggregation. It has also been reported that, in the emulsion technique according to Patent Documents 4 and 5, the organic solvent and the surfactant can remain, and the material, such as the reagent, used during the formation of a zeolite structure can remain as an impurity, which can have an adverse effect on the thermal stability of zeolite.

It is an object of the present invention to provide a functional structure which can exhibit a high catalytic ability when used as a catalyst, and which can resist a decrease in the function of the functional material and thus have a long life.

Means for Solving the Problems

As a result of intensive studies for achieving the object, the inventors have found a functional structure including: supports each having a porous structure and including a zeolite-type compound; and at least one functional material present in the supports and including a metal element (M), in which each of the supports has channels communicating with one another, the functional material is present at least in the channel of each of the supports, and the metal element (M) having constituted the functional material is partially substituted with an element having constituted the supports, and have completed the present invention based on the findings that such a functional structure can exhibit a high catalytic activity when used as a catalyst, can resist a decrease in the function of the functional material, and can have a long life.

Specifically, the present invention has the following principal features.

(1) A functional structure including: supports each having a porous structure and including a zeolite-type compound; and at least one functional material present in the supports and including a metal element (M), wherein each of the supports has channels communicating with one another, the functional material is present at least in the channel of each of the supports, and the metal element (M) having constituted the functional material is partially substituted with an element having constituted the supports.

(2) The functional structure according to aspect (1), wherein the metal element (M) exists as a central atom of two types of coordination structures in the functional material, a first type being a coordination structure of four-coordination number and a second type being a coordination structure of six-coordination number.

(3) The functional structure according to aspect (1) or (2), wherein a ratio of the number of the metal element (M) in the coordination structure of four-coordination number to the total number of the metal element (M) in the coordination structure of four-coordination number and the coordination structure of six-coordination number is 0.15 or more, by atomic ratio.

(4) A functional structure including: supports each having a porous structure and including a zeolite-type compound; and at least one functional material present in the supports and including a metal element (M), wherein each of the supports has channels communicating with one another, the functional material is present at least in the channel of each of the supports, and the existence ratio P of the metal element (M) forming a coordination structure of four-coordination number is 0.15 or more, the existence ratio P being calculated by substituting into formula (1) value (a) representing a peak intensity of a metal element forming the coordination structure of four-coordination number (a metal element being in the functional structure and having a spectral pattern corresponding to metallosilicate) and value (b) representing a peak intensity of a metal element forming a coordination structure of six-coordination number (a metal element being in the functional structure and having a spectral pattern corresponding to a metal oxide before being reduced to metal), based on an X-ray absorption near edge structure (XANES) spectrum determined from an absorption edge of the metal in the functional structure measured by X-ray absorption fine structure (XAFS) measurement.

$$P=(a)/(a+b) \qquad (1)$$

(5) The functional structure according to aspect (4), wherein the existence ratio P is 0.25 or more.

(6) The functional structure according to any one of aspects (1) to (5), wherein the channels have any one of a one-dimensional pore, a two-dimensional pore, and a three-dimensional pore of a framework structure of the zeolite-type compound, and have an enlarged pore portion different from the one-dimensional pore, the two-dimensional pore, and the three-dimensional pore, and the functional material is present at least in the enlarged pore portion.

(7) The functional structure according to aspect (6), wherein the enlarged pore portion connects a plurality of pores constituting any one of the one-dimensional pore, the two-dimensional pore, and the three-dimensional pore.

(8) The functional structure according to any one of aspects (1) to (7), wherein the functional material comprises a catalytic material, and each of the supports carries at least one catalytic material.

(9) The functional structure according to aspect (8), wherein the catalytic material is in the form of a metal oxide fine particle.

(10) The functional structure according to aspect (9), wherein the metal oxide fine particle has an average particle size larger than an average inner diameter of the channels and equal to or smaller than an inner diameter of the enlarged pore portion.

(11) The functional structure according to aspect (9), wherein the metal element (M) of the metal oxide fine particle is included in an amount from 0.5 to 2.5 mass % with respect to the functional structure.

(12) The functional structure according to any one of aspects (9) to (11), wherein the metal oxide fine particle has an average particle size of 0.1 nm to 50 nm.

(13) The functional structure according to any one of aspects (9) to (12), wherein a ratio of the average particle size of the metal oxide fine particle to the average inner diameter of the channels is from 0.06 to 500.

(14) The functional structure according to any one of aspects (1) to (13), wherein the channels have an average inner diameter of 0.1 nm to 1.5 nm.

(15) The functional structure according to any one of aspects (1) to (14), further including at least one additional functional material held on an outer surface of the support.

(16) The functional structure according to aspect (15), wherein the content of at least one functional material present in the support is higher than the content of the at least one additional functional material held on the outer surface of the support.

(17) The functional structure according to any one of aspects (1) to (16), wherein the zeolite-type compound is a silicate compound.

Effects of the Invention

The present invention makes it possible to provide a functional structure which can exhibit a high catalytic ability when used as a catalyst, and which can resist a decrease in the function of the functional material and thus have a long life.

BRIEF DESCRIPTION OF THE DRAWINGS

FIGS. 1(a) and 1(b) are views schematically showing the inner structure of a functional structure according to an embodiment of the present invention, in which FIG. 1(a) is a perspective view (shown partially in transverse cross-sectional view), and FIG. 1(b) is a partially enlarged cross-sectional view.

FIGS. 2(a) and 2(b) are partially enlarged cross-sectional views for illustrating an example of the function of the functional structure shown in FIGS. 1(a) and 1(b), in which FIG. 2(a) is a view for illustrating a sieving function, and FIG. 2(b) is a view for illustrating a catalytic function.

FIG. 3 is a flowchart showing an example of a method for producing the functional structure of FIGS. 1(a) and 1(b).

PREFERRED MODE FOR CARRYING OUT THE INVENTION

Figure 1A:
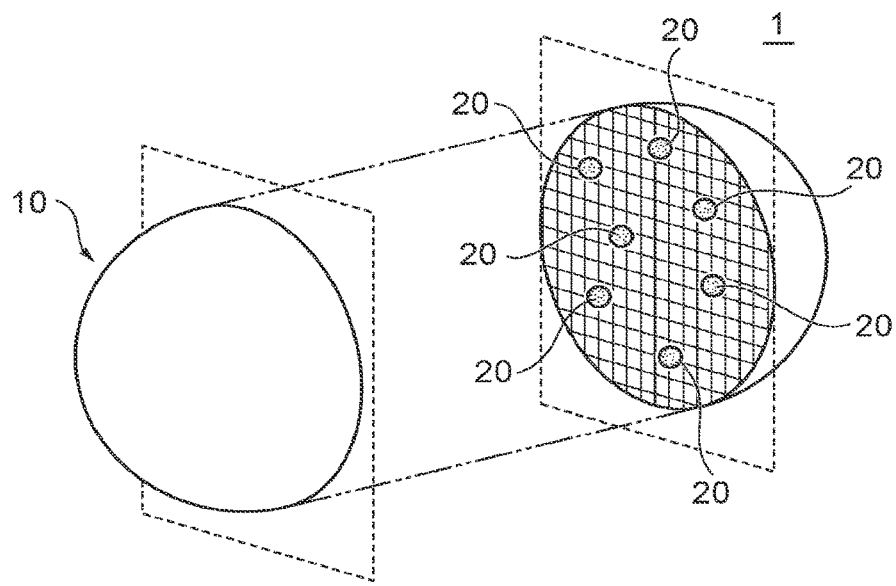
Figure 1B:
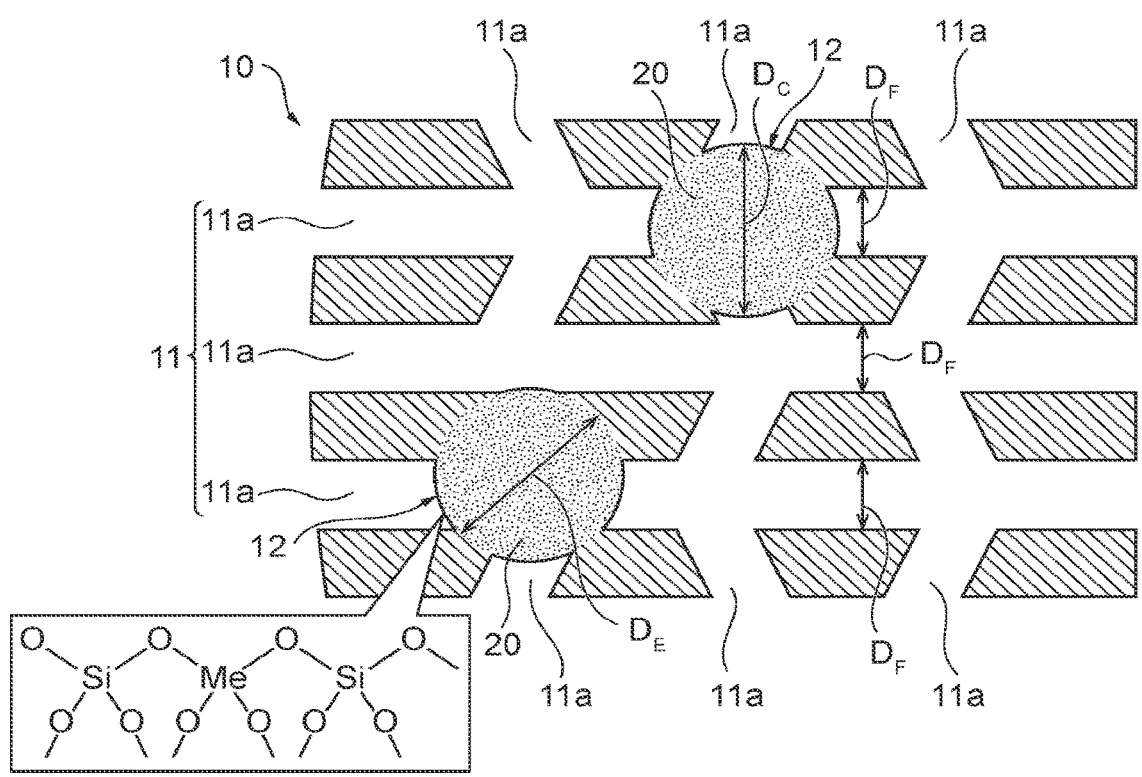

Hereinafter, embodiments of the present invention will be described in detail regarding the drawings.
Configuration of Functional Structure FIGS. 1(a) and 1(b) are views schematically showing the configuration of a functional structure according to an embodiment of the present invention, in which FIG. 1(a) is a perspective view (shown partially in transverse cross-sectional view), and FIG. 1(b) is a partially enlarged cross-sectional view. It should be noted that FIGS. 1(a) and 1(b) show only an example of the functional structure, and the configuration shown in FIGS. 1(a) and 1(b) such as shapes or dimensions are not intended to limit that of the present invention.

As shown in FIG. 1(a), a functional structure 1 includes frameworks 10 serving as supports each having a porous structure and including a zeolite-type compound, and at least one functional material 20 present in the frameworks 10.

The functional material 20 is a material that performs one or more functions alone or in cooperation with the framework 10. Examples of such a function include a catalytic function, a light emitting (fluorescence) function, a light absorbing function, and a discriminating function. The functional material 20 is preferably, for example, a catalytic material having a catalytic function. When the functional material 20 is a catalytic material, the framework 10 serves as a support that carries the catalytic material.

In the functional structure 1, a plurality of the functional material 20, 20, . . . are included in the porous structure of the framework 10. The catalytic material as an example of the functional material 20 is preferably in the form of a metal oxide fine particle. The metal oxide fine particle will be described later in detail. Besides the metal oxide, the functional material 20 may also be in the form of a particle including a metal complex oxide, a mixture or composite of a metal oxide, or a mixture or composite of a metal oxide and a metal.

The framework 10 has a porous structure, and as shown in FIG. 1(b), preferably has multiple pores a, 11a, . . . and channels 11 communicating with one another. The functional material 20 is present at least in the channel 11 of the framework 10 and is preferably held at least in the channel 11 of the framework 10. More preferably, the functional material 20 is partially bonded to the framework 10.

Such a configuration restricts the movement of the functional material 20 in the framework 10 and effectively prevents aggregation of the functional material 20, 20. This results in effective prevention of a decrease in the effective surface area of the functional material 20 and results in long-term retention of the function of the functional material 20. In other words, the functional structure 1 makes it possible to prevent a decrease in the function caused by aggregation of the functional materials 20, and to prolong the life of the functional structure. Moreover, due to the prolonged life of the functional structure, the frequency of replacement of the functional structure can be reduced, and the amount of discarding of the used functional structure can be greatly reduced, which leads to resource-saving.

In general, when the functional structure is used in a fluid (e.g., heavy oil, a reforming gas such as NOx), the functional structure may receive an external force from the fluid. In such a case, if the functional material is held with only deposition state on the outer surface of the framework 10, there will be a problem in that, due to the influence of the external force from the fluid, the functional material can easily separate from the outer surface of the framework 10. On the other hand, in the functional structure 1, the functional material 20 is held at least in the channel 11 of the framework 10 or partially bonded to the framework 10 and thus less likely to separate from the framework 10 even when receiving the influence of the external force from the fluid. Specifically, when the functional structure 1 is placed in the fluid, the fluid flowing into the channels 11 through the pores 11a of the framework 10 encounters flow channel resistance (frictional force), so that the velocity of the fluid flowing in the channel 11 would be lower than that of the fluid flowing on the outer surface of the framework 10. Due to the influence of such flow channel resistance, the pressure applied from the fluid onto the functional material resulting from modification of the functional material 20 held in the channel 11 becomes lower than that applied from the fluid onto the functional material outside the framework 10. Therefore, the functional material 20 present in the framework 11 is effectively prevented from separating from the framework 11, and the function of the functional material 20 can be stably maintained for a long period of time. The flow channel resistance would be higher when the channel 11 of the framework 10 has multiple curves or branches and the interior of the framework 10 has a more complicated three-dimensional structure.

In the functional structure 1, the metal element (M) that has constituted the functional material 20 is partially substituted with the element that has constituted the framework 10. As used herein, the expression "the metal element (M) that has constituted the functional material 20" refers to a metal element (M) derived from the functional material 20. The metal element (M) constituting the framework 10 forms the particle in combination with the metal element (M) contained in the functional material 20. Unfortunately, it is not clear what mechanism causes the partial substitution of the metal element (M) that has constituted the functional material 20 with the element has constituted the framework 10. However, some phenomena, such as thermal diffusion of the metal element (M) in the functional material 20, may cause the atomic level diffusion and movement of the metal element (M) from the functional material 20 to the contact interface between the framework 10 and the functional material 20 or to the inside of the framework 10, so that the metal element (M) that have been contained in the functional material 20 is substituted with the element in the framework 10. Such a configuration allows the framework 10 to function as a solid acid catalyst. Specifically, the functional structure 1 obtained by that can be used as a solid acid catalyst, for example, to promote hydrocracking of hydrocarbons such as naphtha. Further, the functional structure 1 includes at least one functional material 20 present in the framework 10 and including the metal element (M), in which the functional material 20 can suppress, during the reaction of the solid acid catalyst, the deposition of coke produced as a biproduct of the catalytic reaction. If the coke is deposited on the surface of the functional material 20 or the framework 10 (in particular, the solid acid-containing portion), the coke may degrade or destroy the catalytic activity of the functional material 20. Therefore, the functional structure 1 is not only effective in preventing a decrease in function, which would be caused by aggregation or separation of the functional material 20 mentioned above, but also effective in significantly suppressing the deposition of coke by the existence of the functional material 20 so that the catalytic activity can be maintained at an excellent level for a longer period of time.

In the functional structure 1, the metal element (M) preferably exists as a central atom of two types of coordination structures in the functional material, in which the first type is a coordination structure of four-coordination number and a second type is a coordination structure of six-coordination number. In this regard, the "coordination structure of four-coordination number" and the "coordination structure of six-coordination number" can be identified based on an X-ray absorption near edge structure (XANES) spectrum determined from the absorption edge of the metal in the functional structure measured by X-ray absorption fine structure (XAFS) measurement. The metal element (M) forming the "coordination structure of four-coordination number" has a spectral pattern corresponding to metallosilicate and more specifically is partially substituted with the element constituting the framework 10. The metal element (M) forming the "coordination structure of six-coordination number" has a spectral pattern corresponding to a metal oxide before being reduced to metal. In this manner, the metal element (M) is contained not only in the functional material 20 present in the channels of the framework 10 but also in the framework 10.

In the functional structure 1 with such configuration, a ratio of the number of the metal element (M) in the coordination structure of four-coordination number to the total number of the metal element (M) in the coordination structure of four-coordination number and the coordination structure of six-coordination number is preferably 0.15 or more, more preferably 0.20 or more, even more preferably more than 0.20, further more preferably 0.25 or more, and most preferably 0.30 or more, by atomic ratio. The ratio of the number of the metal element (M) in the coordination structure of four-coordination number to the total number of the metal element (M) in the coordination structure of four-coordination number and the coordination structure of six-coordination number is also preferably 0.40 or more, by atomic ratio.

More specifically, the ratio represents the existence ratio P of the metal element (M) forming the coordination structure of four-coordination number, and the existence ratio P is calculated by substituting into the below formula (1) the value (hereinafter also referred to as value (a)) representing the peak intensity of the metal element forming the coordination structure of four-coordination number (the metal element being in the functional structure and having the spectral pattern corresponding to metallosilicate) and the value (hereinafter also referred to as value (b)) representing the peak intensity of the metal element forming the coordination structure of six-coordination number (the metal element being in the functional structure and having the spectral pattern corresponding to the metal oxide before being reduced to metal). If the separation of the peak is necessary, linear coupling of least squares may be used to separate the peak intensity of the metal element forming the coordination structure of four-coordination number and the peak intensity of the metal element forming the coordination structure of six-coordination number. The values a and b for formula (1) below may be determined respectively from the peak area derived from the peak intensity of the metal element forming the coordination structure of four-coordination number and the peak area derived from the peak intensity of the metal element forming the coordination structure of six-coordination number.

$$P=(a)/(a+b) \quad (1)$$

The channels 11 preferably have any one of a one-dimensional pore, a two-dimensional pore, and a three-dimensional pore, which are defined by the framework structure of the zeolite-type compound, and preferably have an enlarged pore portion 12 different from the one-dimensional pore, the two-dimensional pore, and the three-dimensional pore. In this case, the functional material 20 is preferably present at least in the enlarged pore portion 12, more preferably held and included at least in the enlarged pore portion 12, and even more preferably bonded to the enlarged pore portion 12. As used herein, the term "one-dimensional pore" or "one-dimensional pores" refers to a tunnel-type or cage-type pore that forms a one-dimensional channel or refers to multiple tunnel-type or cage-type pores (multiple one-dimensional channels) that form multiple one-dimensional channels. The term "two-dimensional pore" refers to a two-dimensional channel in which multiple one-dimensional channels are connected two-dimensionally. The term "three-dimensional pore" refers to a three-dimensional channel in which multiple one-dimensional channels are connected three-dimensionally.

According to this configuration, the movement of the functional material 20 is further restricted in the framework 10, and separation of the functional material 20 and aggregation of the functional material 20, 20 are more effectively prevented. The state in which the functional material 20 is included in the porous structure of the framework 10 indicates that the functional material 20 is enclosed within the framework 10. In this regard, the functional material 20 and the framework 10 do not always have to be in direct contact with each other over the entire surface of the functional material 20, and any other material (e.g., a surfactant) may be present between the functional material 20 and the framework 10.

The prevention of the partial bonding between the functional material 20 and the framework 10 can make it easy to activate the functional material.

FIG. 1(b) shows a case in which the functional material 20 is included in the enlarged pore portion 12. Such a configuration is non-limiting, and alternatively, the functional material 20 may be bonded to the enlarged pore portion 12 or be held in the channel 11 while partially protruding from the enlarged pore portion 12. Alternatively, the functional material 20 may be partially embedded in a portion of the channel 11 other than the enlarged pore portion 12 (e.g., an inner wall portion of the channel 11) or may be held by fixation or the like. The enlarged pore portion 12 preferably connects a plurality of pores 11a, 11a constituting any one of the one-dimensional pore, the two-dimensional pore, and the three-dimensional pore. According to the configuration, another channel different from the one-dimensional pore, the two-dimensional pore, or the three-dimensional pore is provided in the framework 10 to exert the function of the functional material 20 more effectively.

The channel 11 preferably has a three-dimensional structure including a branching portion or a junction portion inside the framework 10, and the enlarged pore portion 12 is preferably provided at the branching portion or the junction portion of the channel 11.

The average inner diameter $D_F$ of the channels 11 provided in the framework 10 is calculated from the average of the short diameter and the long diameter of the pores 11a constituting any one of the one-dimensional pore, the two-dimensional pore, and the three-dimensional pore. The average inner diameter $D_F$ of the channels 11 is typically from 0.1 nm to 1.5 nm and preferably from 0.5 nm to 0.8 nm. The inner diameter $D_E$ of the enlarged pore portion 12 is typically from 0.5 nm to 50 nm, preferably from 1.1 nm to 40 nm, and more preferably from 1.1 nm to 3.3 nm. The inner diameter $D_E$ of the enlarged pore portion 12 depends, for example, on the pore size of the functional material (A) described later and the average particle size $D_C$ of the functional material 20 to be included. The inner diameter $D_E$ of the enlarged pore portion 12 is such that it is possible to include the functional material 20.

The framework 10 includes a zeolite-type compound. Examples of the zeolite-type compound include silicate compounds such as zeolite (aluminosilicate), cation-exchanged zeolite and silicalite, zeolite analogue compounds such as aluminoborate, aluminoarsenate and germanate, and phosphate-based zeolite analogue materials such as molybdenum phosphate. Among them, the zeolite-type compound is preferably a silicate compound.

The framework structure of the zeolite-type compound may be selected from FAU type (Y type or X type), MTW type, MFI type (ZSM-5), FER type (ferrierite), LTA type (A type), MWW type (MCM-22), MOR type (mordenite), LTL type (L type), BEA type (beta type), and so on, and is preferably MFI type and more preferably ZSM-5. The zeolite-type compound has multiple pores with a diameter (size) depending on the framework structure. For example, an MFI-type zeolite compound has a maximum pore size of 0.636 nm (6.36 Å) and an average pore size of 0.560 nm (5.60 Å).

Hereinafter, a detailed description will be provided of a case in which the functional material 20 is in the form of the metal oxide fine particles (hereinafter also referred to as "fine particles").

When the functional material 20 is in the form of a fine particle which may be a primary particle or a secondary particle resulting from the aggregation of the primary particles, the fine particle 20 preferably has an average particle size $D_C$ larger than the average inner diameter $D_F$ of the channels 11 and equal to or smaller than the inner diameter $D_E$ of the enlarged pore portion 12 ($D_F < D_C \leq D_E$). The fine particles 20 with such size are preferably included in the enlarged pore portions 12 in the channels 11, so that the movement of the fine particles 20 is restricted in the framework 10. More preferably, such fine particles 20 are held in and partially bonded to the enlarged pore portions 12 so that the movement of the fine particles 20 is further suppressed.

Therefore, even when an external force is applied from a fluid to the fine particles 20, the movement of the fine particles 20 is suppressed in the framework 10, so that the fine particles 20, 20 . . . respectively included in or bonded to the enlarged pore portions 12 dispersed in the channels 11 of the framework 10 are effectively prevented from coming into contact with one another.

In the form of either a primary particle or a secondary particle, the functional material 20 in the form of the metal oxide fine particle preferably has an average particle size $D_C$ of from 0.1 nm to 50 nm, more preferably 0.1 nm or more and less than 30 nm, even more preferably from 0.4 nm to 14.0 nm, and further more preferably from 1.0 nm to 3.3 nm. The ratio ($D_C/D_F$) of the average particle size $D_C$ of the metal oxide fine particles 20 to the average inner diameter $D_F$ of the channels 11 is preferably from 0.06 to 500, more preferably from 0.1 to 36, even more preferably from 1.1 to 36, and further more preferably from 1.7 to 4.5.

When the functional material 20 is in the form of the metal oxide fine particle, the content of the metal element (M) of the metal oxide fine particles in the functional structure 1 is preferably 0.5 mass % or more and 7.6 mass % or less, more preferably 0.5 mass % or more and 6.9 mass % or less, even more preferably 0.5 mass % or more and 2.5 mass % or less, and further more preferably 0.5 mass % or more and 1.5 mass % or less with respect to the mass of the functional structure 1. For example, when the metal element (M) is Co, the content (mass %) of the Co element is expressed by {(the mass of Co element)/(the mass of all elements in the functional structure 1)}×100.

The metal oxide fine particles only have to include a metal oxide. For example, the metal oxide fine particles may include a single metal oxide or a mixture of two or more metal oxides. The term "metal oxide" used herein to indicate the component (material) of the metal oxide fine particles is a generic term for an oxide or oxides containing at least one metal element (M), which is intended to include an oxide containing a single metal element (M) and a complex oxide containing two or more metal elements (M).

Examples of such a metal oxide include cobalt oxide ($CoO_x$), nickel oxide ($NiO_x$), iron oxide ($FeO_x$), copper oxide ($CuO_x$), zirconium oxide ($Zro_x$), cerium oxide ($CeO_x$), aluminum oxide ($AlO_x$), niobium oxide ($NbO_x$), titanium oxide ($TiO_x$), bismuth oxide ($BiO_x$), molybdenum oxide ($MoO_x$), vanadium oxide ($VO_x$), and chromium oxide ($CrO_x$). The metal oxide fine particles are preferably composed mainly of one or more of oxides.

The ratio (Si/M atomic ratio) of the number of silicon (Si) atoms in the framework 10 to the number of metal element (M) atoms in the fine particle 20 is preferably from 10 to 1000 and more preferably from 50 to 200. If the ratio is more than 1000, the effect of the functional material may not be a sufficient level, such as low activity. If the ratio is less than 10, the content of the fine particles 20 may be too high so that the strength of the framework 10 may tend to reduce. It should be noted that, the fine particles 20 described herein are the fine particles held, carried, or bonded inside the framework 10 and are not intended to include the fine particles deposited on the outer surface of the framework 10.

Function of Functional Structure

As mentioned above, the functional structure 1 includes a framework 10 with a porous structure and at least one functional material 20 present in the framework 10. When the functional material 20 present in the framework of the functional structure 1 is brought into contact with a fluid, the function depending on the functional material 20 is exhibited. Specifically, a fluid coming into contact with the outer surface 10a of the functional structure 1 is allowed to flow into the interior of the framework 10 through a pore 11a formed at the outer surface 10a, then guided into the channels 11, and allowed to pass through the channels 11 and to flow out of the functional structure 1 through another pore 11a. When the functional material 20 held in or bonded to the channel 11 comes into contact with the fluid passing through the channel 11, a reaction (e.g., catalytic reaction) depending on the function of the functional material 20 is caused. The functional structure 1 also has a molecular sieving ability since the framework has a porous structure.

Figure 2A:
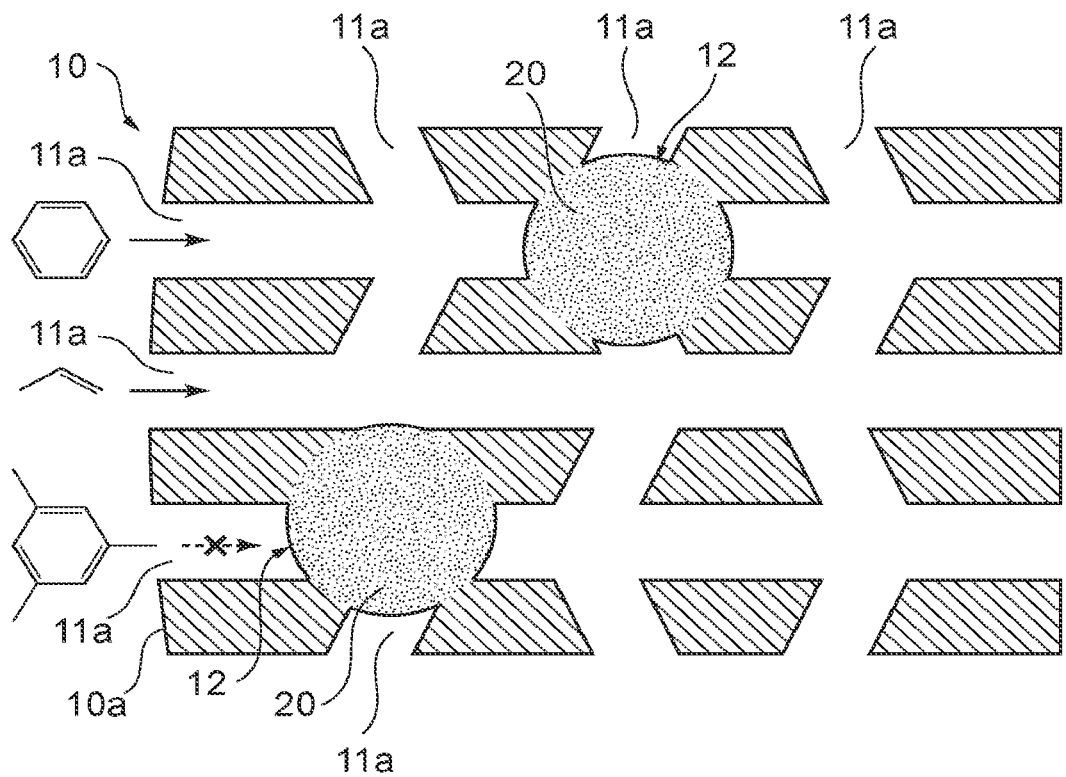

First, the molecular sieving ability of the functional structure 1 will be described with reference to FIG. 2(a) and an example in which the fluid is a liquid including benzene, propylene and mesitylene. As shown in FIG. 2(a), a compound (e.g., benzene or propylene) composed of molecule having size equal to or smaller than the diameter of the pore 11a, in other words, equal to or smaller than the inner diameter of the channel 11, can enter the framework 10. On the other hand, a compound (e.g., mesitylene) composed of molecule having size exceeding the diameter of the pore 11a cannot enter the framework 10 based on the shape of the molecules. Accordingly, among multiple compounds in the fluid, some compounds not capable of entering the framework 10 are restricted from reacting, and some other compounds capable of entering the framework 10 are allowed to react.

Among compounds produced by reactions in the framework 10, only compound composed of molecule having size equal to or smaller than the diameter of the pore 11a can exit through the pore 11a to the exterior of the framework 10 to obtain as a reaction product. On the other hand, some compounds are not capable of exiting through the pore 11a to the exterior of the framework 10. If such compounds are converted into compounds composed of molecule having size that allow exit to the exterior of the framework 10, the compounds can exit to the exterior of the framework 10. As a result, the use of the functional structure 1 makes it possible to selectively obtain a specific reaction product.

Figure 2B:
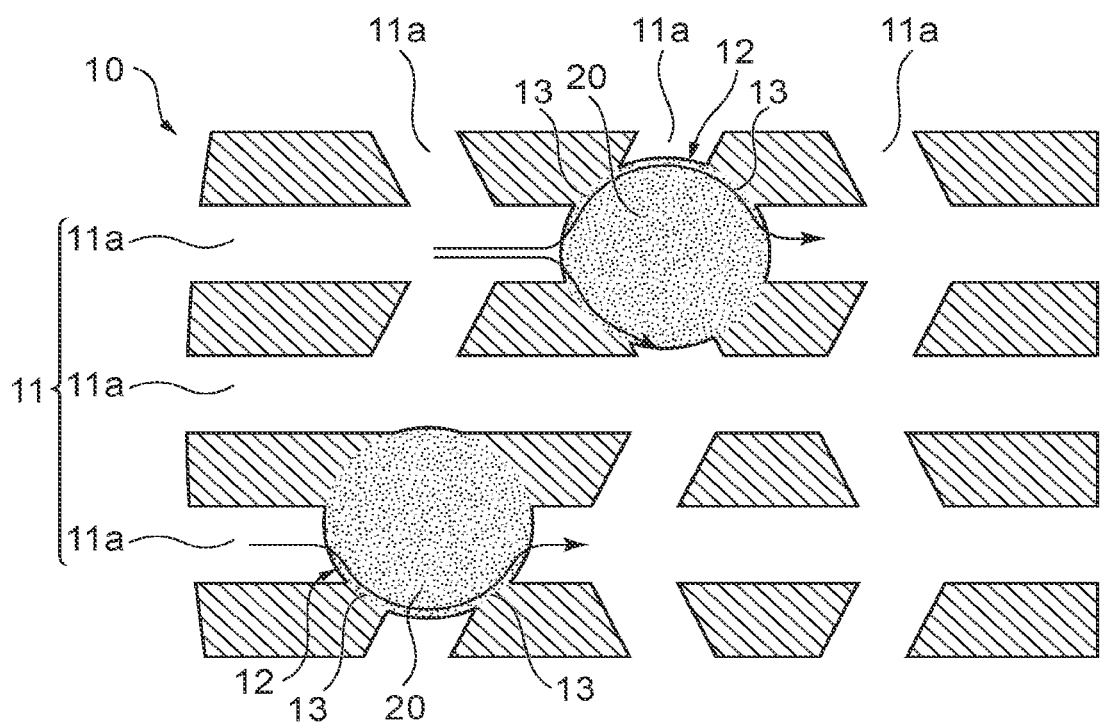

In the functional structure 1, as shown in FIG. 2(b), the functional material 20 is preferably included or held in the enlarged pore portion 12 of the channel 11 and bonded to the channel 11. When the average particle size $D_C$ of the functional material 20 in the form of the metal oxide fine particle is larger than the average inner diameter $D_F$ of the channel 11 and smaller than the inner diameter $D_E$ of the enlarged pore portion 12 ($D_F < D_C < D_E$), a small channel 13 is provided between the metal oxide fine particle and the enlarged pore portion 12. In this case, as indicated by the arrow in FIG. 2(b), the fluid entering the small channel 13 comes into contact with the metal oxide fine particle. Each metal oxide fine particle included in and bonded to the enlarged pore portion 12 is restricted from moving in the framework 10. Thus, the metal oxide fine particles are prevented from aggregating in the framework 10. As a result, a large contact area can be stably maintained between the metal oxide fine particles and the fluid.

Next, a description will be provided of a case in which the functional material 20 has a catalytic function. Specifically, a description will be provided of an example in which the functional material 20 is in the form of the iron oxide ($FeO_x$) fine particles and butylbenzene is allowed to enter the framework 10 of the functional structure 1. When butylbenzene enters into the framework 10, butylbenzene undergoes decomposition reaction to form benzene, butene (1-butene and 2-butene), and other lower olefins as shown below. This means that the functional material 20 functions as a catalyst for decomposition reaction. Such decomposition reaction of butylbenzene using the functional structure 1 can produce butene and other lower olefins which are useful as raw materials for a variety of chemicals. In particular, the functional structure 1 with such configuration enables highly active decomposition reaction of butylbenzene and provides high selectivity for butene and lower olefins during such reaction, with low production of coke which is a biproduct capable of reducing the catalytic activity. Therefore, the functional structure 1 with such configuration is useful as a catalyst for decomposition reaction of butylbenzene to produce butane and lower olefins.

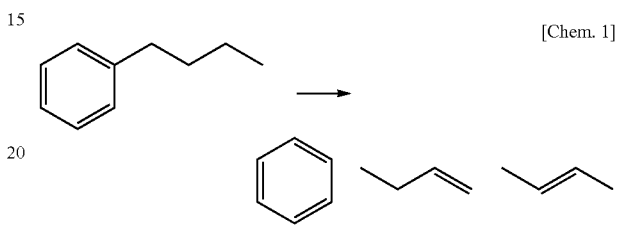

[Chem. 1]

The functional structure 1 with such configuration is considered to have an appropriate level of acidity for olefin production, since iron element (Fe) that has constituted the functional material is partially substituted with the element constituting the support. If the acidity level is too high, olefins may undergo hydrogen transfer reaction. If the acidity level is too low, the catalytic activity may be too low to cause the decomposition reaction. The reaction mentioned above may also be allowed to proceed using an acid catalyst such as vanadium oxide, tungsten oxide, or molybdenum oxide.

Further, a description will be provided of an example in which the functional material 20 is in the form of the iron oxide ($FeO_x$) fine particle and dodecylbenzene as a component of heavy oil is allowed to enter the framework 10 of the functional structure 1. When dodecylbenzene enters into the framework 10, dodecylbenzene is converted by oxidative decomposition reaction into alcohols and ketones as shown below. Benzene that is a component of light oil is also produced from a ketone (acetophenone in this case) one of the decomposition products. In this manner, heavy oil can be converted to light oil using the functional structure 1. In conventional art, the hydrogenolysis process using hydrogen is performed to convert heavy oil to light oil. In contrast, using the functional structure 1 eliminates the need for hydrogen. In places with difficulty in hydrogen supply, therefore, the functional structure 1 is useful to convert heavy oil to light oil. Elimination of the need for hydrogen can reduce the cost, which is expected to promote the use of heavy oil having not been in full use.

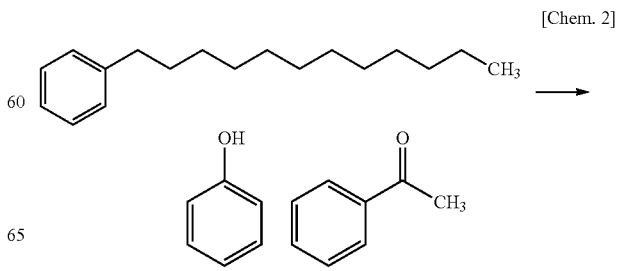

[Chem. 2]

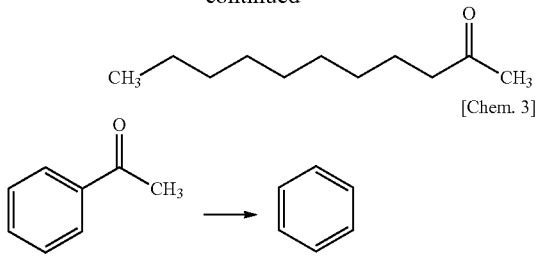

[Chem. 3]

Method of Producing Functional Structure

FIG. 3 is a flowchart showing a method of producing the functional structure 1 of FIGS. 1(a) and 1(b). Hereinafter, an example of the method for producing the functional structure containing the functional material in the form of the metal oxide fine particle present in the framework will be described.

Step S1: Preparation Step

As shown in FIG. 3, first, a precursor material (A) for obtaining a framework having a porous structure and including a zeolite-type compound is prepared. The precursor material (A) is preferably a regular mesoporous material, and may be appropriately selected depending on the type (composition) of the zeolite-type compound constituting the framework of the functional structure.

When the zeolite-type compound constituting the framework of the functional structure is a silicate compound, the regular mesoporous material is preferably a compound having a Si—O skeleton having pores with a pore size of from 1 to 50 nm uniformly and regularly developed one-dimensionally, two-dimensionally, or three-dimensionally. Such a regular mesoporous material is obtained as a variety of synthetic products depending on the synthesis conditions. Examples of such synthetic products include SBA-1, SBA-15, SBA-16, KIT-6, FSM-16, and MCM-41. In particular, MCM-41 is preferred. For reference, SBA-1 has a pore size of from 8 to 30 nm, SBA-15 has a pore size of from 6 to 10 nm, SBA-16 has a pore size of 6 nm, KIT-6 has a pore size of 9 nm, FSM-16 has a pore size of from 3 to 5 nm, and MCM-41 has a pore size of from 1 to 10 nm. Examples of such a regular mesoporous material include mesoporous silica, mesoporous aluminosilicate, and mesoporous metallosilicate.

The precursor material (A) may be a commercially available product or a synthetic product. The precursor material (A) may be synthesized using a known method for synthesizing a regular mesoporous material. For example, a mixture solution which contains a raw material containing constituent element of the precursor material (A) and a casting agent for controlling the structure of the precursor material (A) is prepared, the pH of the mixture solution is optionally adjusted, and the mixture solution is subjected to hydrothermal treatment (hydrothermal synthesis). Subsequently, the precipitate (product) resulting from the hydrothermal treatment is collected (e.g., filtered off), washed and dried if necessary, and then calcinated to obtain a precursor material (A) as a powdery regular mesoporous material. In this process, the solvent for the mixture solution may be, for example, water, an organic solvent such as alcohol, or a mixed solvent thereof. The raw material may be selected depending on the type of the framework. Examples of the raw material include silica agents such as tetraethoxysilane (TEOS), fumed silica, and quartz sand. The casting agent may be any of various surfactants and block copolymers. Various types of surfactants, block copolymers, and the like can be used as the casting agent. The casting agent is preferably selected depending on the type of the regular mesoporous material to be synthesized. For example, MCM-41 is produced, a surfactant such as hexadecyltrimethylammonium bromide is preferable. The hydrothermal treatment may be performed, for example, in a sealed vessel under conditions at from 80 to 800° C. and from 0 to 2000 kPa for from 5 hours to 240 hours. The calcining treatment may be performed, for example, in the air under conditions at from 350 to 850° C. for from 2 to 30 hours.

Step S2: Impregnation Step

Next, the prepared precursor material (A) is impregnated with a metal-containing solution to form a precursor material (B).

The metal-containing solution may be any solution containing a metal component (e.g., a metal ion) corresponding to the metal element (M) constituting the metal oxide fine particle of the functional structure. For example, the metal-containing solution may be prepared by dissolving, in a solvent, a metal salt containing the metal element (M). Examples of such a metal salt include chlorides, hydroxides, oxides, sulfates, and nitrates, among which nitrates are preferred. The solvent may be, for example, water, an organic solvent such as alcohol, or a mixed solvent thereof.

Any method may be used to impregnate the precursor material (A) with the metal-containing solution. For example, before the calcination step described later, the impregnation is preferably performed by adding the metal-containing solution little by little in multiple portions to the powdery precursor material (A) being stirred. In order to allow the metal-containing solution to more easily enter into the pores of the precursor material (A), a surfactant is preferably added as an additive in advance before the addition of the metal-containing solution. Such an additive can act to cover the outer surface of the precursor material (A) and thus to inhibit the adhesion of the metal-containing solution on the outer surface of the precursor material (A), so that the metal-containing solution subsequently could easily enter into the pores of the precursor material (A).

Examples of such an additive include nonionic surfactants such as polyoxyethylene oleyl ether, polyoxyethylene alkyl ether, and polyoxyethylene alkyl phenyl ether. These surfactants have a large molecular size and thus cannot enter into the pores of the precursor material (A), which suggests that the surfactants will not adhere to the interior of the pores and will not hinder the entering the metal-containing solution into the pores. A method of adding the nonionic surfactant preferably includes, for example, adding from 50 to 270 mass % of the nonionic surfactant to the precursor material (A) before the calcination step described later. If the addition amount of the nonionic surfactant to the precursor material (A) is less than 50 mass %, the inhibiting effect may be difficult to achieve, and if the addition amount of the nonionic surfactant to the precursor material (A) is more than 500 mass %, undesirably high viscosity may be reached. Therefore, the addition amount of the nonionic surfactant to the precursor material (A) is set to a value within the above range.

Preferably, the addition amount of the metal-containing solution added to the precursor material (A) is appropriately adjusted in view of the amount of the metal element (M) contained in the metal-containing solution with which the precursor material (A) is to be impregnated (in other words, the amount of the metal element (M) to be present in the precursor material (B)). Before the calcination step described later, for example, the addition amount of the metal-containing solution added to the precursor material (A) is preferably adjusted such that the ratio (Si/M atomic ratio) of the number of silicon (Si) atoms in the precursor material (A) to the number of the metal element (M) atoms contained in the metal-containing solution is set to from 10 to 1000 and more preferably from 50 to 200. For example, when a surfactant is added as an additive to the precursor material (A) before the addition of the metal-containing solution to the precursor material (A), the addition amount of the metal-containing solution added to the precursor material (A) may be adjusted such that the calculated Si/M atomic ratio can be from 50 to 200. In such a case, the content of the metal element (M) of the metal oxide fine particles can be adjusted from 0.5 to 7.6 mass % based on the functional structure. In the state of the precursor material (B), the content of the metal element (M) present within the porous is generally proportional to the addition amount of the metal-containing solution added to the precursor material (A) as long as the metal concentration of the metal-containing solution, the presence or absence of the additive, and other conditions such as temperature and pressure remain constant. The amount of the metal element (M) present in the precursor material (B) is also proportional to the amount of the metal element constituting the metal oxide fine particles present in the framework of the functional structure. Accordingly, when the addition amount of the metal-containing solution added to the precursor material (A) is controlled within the above range, the pores of the precursor material (A) can be sufficiently impregnated with the metal-containing solution, which makes it possible to adjust the content of the metal oxide fine particles present in the framework of the functional structure.

After the precursor material (A) is impregnated with the metal-containing solution, washing treatment may be performed if necessary. The washing liquid used may be water, an organic solvent such as alcohol, or a mixed solution thereof. Drying treatment is also preferably performed after the impregnation of the precursor material (A) with the metal-containing solution and then optionally after the washing treatment. The drying treatment may include natural drying overnight or so or drying at a high temperature of 150° C. or less. The drying is preferably performed thoroughly because the framework structure of the precursor material (A) as the regular mesoporous material may collapse if the calcination treatment described later is performed while a large amount of water contained in the metal-containing solution or in the washing liquid remains in the precursor material (A).

Step S3: Calcination Step

Next, the precursor material (B) is calcinated to form a precursor material (C). The precursor material (B) is a product obtained through impregnating, with the metal-containing solution, the precursor material (A) for forming the framework having a porous structure and including the zeolite-type compound.

The calcining is preferably carried out, for example, in the air under conditions at from 350 to 850° C. for 2 to 30 hours. Such calcination treatment allows the growth of crystals of the metal component entering into the pores for the regular mesoporous material, so that the metal oxide fine particles are formed in the pores.

Step S4: Hydrothermal Treatment Step

Then, a mixture solution of the precursor material (C) and a structure-directing agent is prepared, and the precursor material (C) obtained by calcining the precursor material (B) is subjected to hydrothermal treatment to obtain a functional structure.

The structure-directing agent is a casting agent for directing the framework structure of the framework of the functional structure. The structure-directing agent may be at least one of an organic structure-directing agent (usually abbreviated as "OSDA") and an inorganic structure-directing agent having $OH^-$. The organic structure-directing agent may be, for example, a surfactant. The organic structure-directing agent is preferably selected depending on the framework structure of the framework of the functional structure, and preferred examples thereof include a surfactant such as tetramethylammonium bromide (TMABr), tetraethylammonium bromide (TEABr), tetrapropylammonium bromide (TPABr), or tetraethylammonium hydroxide (TEAOH). Typical examples of the inorganic structure-directing agent include alkali metal hydroxides and alkaline earth metal hydroxides, and preferred examples thereof include lithium hydroxide (LiOH), sodium hydroxide (NaOH), potassium hydroxide (KOH), rubidium hydroxide (Rb(OH)), calcium hydroxide ($Ca(OH)_2$), and strontium hydroxide ($Sr(OH)_2$).

The precursor material (C) and the structure-directing agent may be mixed during or before the hydrothermal treatment step. Any method may be used to prepare the mixture solution. The precursor material (C), the structure-directing agent, and the solvent may be mixed at the same time, or the precursor material (C) and the structure-directing agent may be separately dispersed into individual solvents and then the resulting dispersion solutions may be mixed. The solvent may be, for example, water, an organic solvent such as alcohol, or a mixed solvent thereof. Before the hydrothermal treatment, the mixture solution is preferably subjected to pH adjustment using an acid or a base.

The hydrothermal treatment may be carried out using a known method, which is preferably performed in a sealed vessel under conditions at from 80 to 800° C. and from 0 to 2000 kPa for 5 hours to 240 hours. The hydrothermal treatment is also preferably performed in a basic atmosphere. Although the reaction mechanism is not necessarily clear, the hydrothermal treatment using the precursor material (C) as a raw material can gradually destroy the framework structure of the precursor material (C) as the regular mesoporous material but can form a new framework structure (porous structure) for the framework of the functional structure due to the action of the structure-directing agent while the position of the metal oxide fine particles in the pores of the precursor material (C) substantially remains. The resulting functional structure includes a framework of a porous structure and metal oxide fine particles present in the framework, in which the framework has channels connecting multiple pores derived from the porous structure, and at least some of the metal oxide fine particles are held in or bonded to the channel of the framework.

In the embodiment of the hydrothermal treatment step, the mixture solution of the precursor material (C) and the structure-directing agent is prepared, and then the precursor material (C) is subjected to hydrothermal treatment. However, the hydrothermal treatment step is non-limited, the precursor material (C) may be hydrothermally treated without being mixed with the structure-directing agent and the precursor material (C).

Preferably, the precipitate (functional structure) resulting from the hydrothermal treatment is collected (e.g., filtered off) and then optionally washed, dried, and calcinated. The washing liquid may be water, an organic solvent such as alcohol, or a mixed solution thereof. The drying treatment may include natural drying overnight or so or drying at a high temperature of 150° C. or less. The drying is preferably performed thoroughly because the framework structure of the functional structure as the framework may collapse if the calcination treatment is performed while a large amount of water remains in the precipitate. The calcination treatment may be performed, for example, in the air under conditions at from 350 to 850° C. for 2 to 30 hours. During such calcination treatment, the structure-directing agent is burned away from the functional structure. Depending on the intended use, the functional structure may be used as it is without undergoing the calcination treatment of the collected precipitate. For example, when the functional structure is used in a high-temperature oxidative atmosphere environment, the structure-directing agent will be burned away by exposing the functional structure to the usage environment for a certain period of time. In such a case, the resulting functional structure can be used without any modification since such a functional structure is substantially the same as that obtained after the calcination treatment.

Modifications of Functional Structure 1

Figure 4:
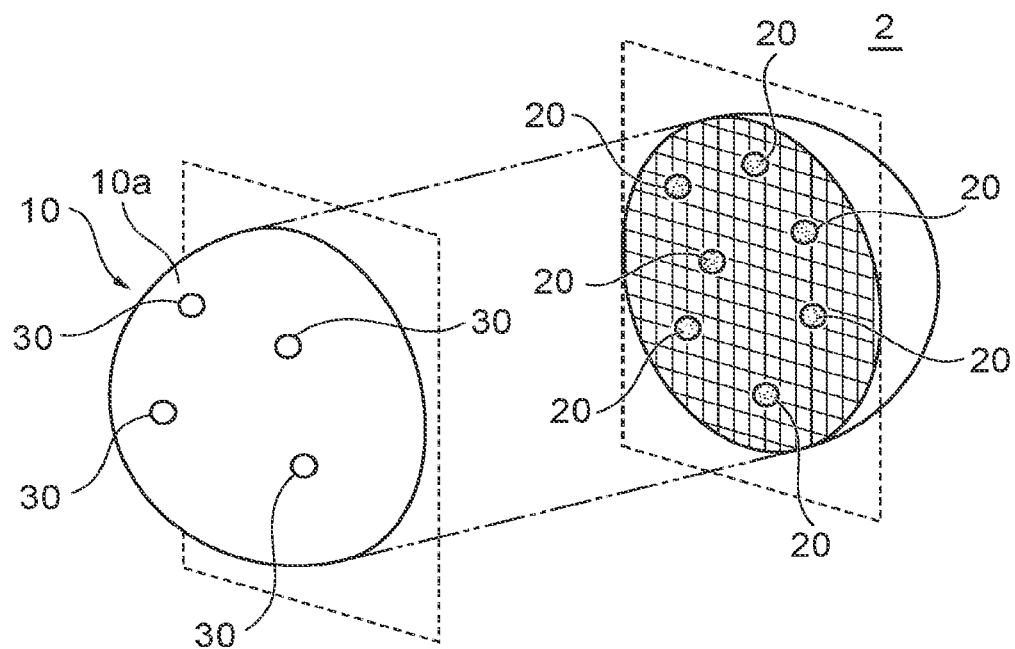
FIG. 4 is a schematic view showing a modification of the functional structure of FIGS. 1(a) and 1(b).

FIG. 4 is a schematic view showing a modification of the functional structure 1 of FIGS. 1(a) and 1(b). The functional structure 1 shown in FIGS. 1(a) and 1(b) includes the framework 10 and the functional material 20 present in the framework 10. Such a structure is non-limiting, and, as shown in FIG. 4, for example, a functional structure 2 may further include an additional functional material 30 held on an outer surface 10a of the framework 10.

The functional material 30 can perform one or more functions. The function of the additional functional material 30 may be the same as or different from that of the functional material 20. Examples of the function of the additional functional material 30 may be the same as that of the functional material 20. In particular, the additional functional material 30 is preferably a catalytic material having a catalytic function. When both of the functional materials 20 and 30 have the same function, a material of the additional functional material 30 may be the same as or different from that of the functional material 20. According to the configuration, the content of the functional material held on the functional structure 2 can be increased, which further enhances the function of the functional material.

In this case, the content of the functional material 20 present in the framework 10 is preferably higher than the content of the additional functional material 30 held on the outer surface 10a of the framework 10. In such a case, the function of the functional material 20 bonded inside the framework 10 can be dominant, and the function of the functional materials can be stably exhibited.

While the functional structures according to embodiments of the present invention have been described, it will be understood that the embodiments are not intended to limit the present invention and may be altered or modified in various ways based on the technical idea of the present invention.

EXAMPLES

Examples 1 to 2

Synthesis of Precursor Material (A)

An aqueous solution of a mixture of a silica agent (tetraethoxysilane (TEOS) manufactured by Wako Pure Chemical Industries, Ltd.) and a surfactant as a casting agent was prepared, then subjected to pH adjustment as needed, and then hydrothermally treated in a sealed vessel at from 80 to 350° C. for 100 hours. Subsequently, the produced precipitate was filtered off, then washed with water and ethanol, and then calcinated in the air at 600° C. for 24 hours to obtain a precursor material (A) of the type and pore size shown in Table 1. The following surfactant was used according to the type of the precursor material (A) ("Type of precursor material (A): surfactant").

MCM-41: Hexadecyltrimethylammonium Bromide (CTAB) (Manufactured by Wako Pure Chemical Industries, Ltd.)

Preparation of Precursor Materials (B) and (C)

Next, depending on the type of the metal element (M) constituting the metal oxide fine particles shown in Table 1, a metal salt containing the metal element (M) was dissolved in water to prepare a metal-containing aqueous solution. The following metal salt was used according to the type of the metal oxide fine particles ("Metal oxide fine particle: metal salt").

$FeO_x$: Iron Nitrate (III) Nonahydrate (Manufactured by Wako Pure Chemical Industries, Ltd.)

Regarding the examples with "O-15" shown in the "Additive" column of Table 1, a pretreatment was performed in which an aqueous solution of polyoxyethylene (15) oleyl ether (NIKKOL BO-15V, manufactured by Nikko Chemicals Co., Ltd., hereinafter abbreviated as "O-15") as an additive was added to the powdery precursor material (A). Subsequently, the metal-containing aqueous solution was added little by little in multiple portions to the pretreatment sample, and the resulting product was then dried at room temperature (20° C.±10° C.) for at least 12 hours to give the precursor material (B).

The addition amount of the metal-containing aqueous solution added to the precursor material (A) was adjusted such that the calculated ratio (Si/M atomic ratio) of the silicon (Si) content of the precursor material (A) to the metal element (M) content of the metal-containing aqueous solution was as shown in Table 1.

Subsequently, the resulting precursor material (B) impregnated with the metal-containing aqueous solution was calcinated in the air at 550° C. for 12 hours to obtain the precursor material (C).

Synthesis of Functional Structure

An aqueous solution of a mixture of the resulting precursor material (C) and sodium hydroxide and the structure-directing agent (OSDA) in the amount adjusted to achieve the Na/(Na+OSDA) ratio shown in Table 1 was prepared and then hydrothermally treated in a sealed vessel at from 80 to 350° C. under the pH and time conditions shown in Table 1. Subsequently, the produced precipitate was filtered off, then washed with water, then dried at 100° C. for at least 12 hours, and then calcinated in the air at 550° C. for 12 hours to obtain the functional structure including the framework and the metal oxide fine particles as the functional material as shown in Table 1 (Examples 1 and 2).

Comparative Example 1

In Comparative Example 1, the impregnation method was used to deposit the $FeO_x$ particles on the outer surface of the MFI type silicalite.

Specifically, using the same process as in the examples, the metal-containing aqueous solution in the amount adjusted to achieve the content shown in Table 1 was added to the precursor material (A) to obtain the MFI type silicalite impregnated with the metal-containing aqueous solution. The product was then calcinated under the same conditions to obtain the functional structure of Comparative Example 1.

Comparative Example 2

In Comparative Example 2, Fe metal was substituted for the framework of the MFI type silicalite. Specifically, an aqueous solution of a mixture of tetraethyl orthosilicate (TEOS), a metal-containing solution, and tetrapropylammonium bromide (TPABr) as a structure-directing agent was prepared and then hydrothermally treated in a sealed vessel at from 80 to 350° C. Subsequently, the produced precipitate was filtered off, then washed with water, then dried, and then calcinated in the air. As a result, the metallosilicate having the framework containing Fe element was obtained.

Comparative Example 3

In Comparative Example 3, $H^+$ type ZSM-5 was prepared. Specifically, an aqueous solution of a mixture of sodium silicate, aluminum sulfate, and tetrapropylammonium bromide (TPABr) as a structure-directing agent was prepared and then hydrothermally treated in a sealed vessel at from 80 to 350° C. Subsequently, the produced precipitate was filtered off, then washed with water, then dried, and then calcinated in the air. After the calcination, the product was converted to the $NH_4^+$ type by the ion exchange using an ammonium nitrate aqueous solution and then converted to the $H^+$ type by calcination before being subjected to reaction.
Evaluation The functional structures of the examples and the silicalite of the comparative example were evaluated for the various characteristics under the conditions shown below.
(A) Cross-Sectional Observation Samples for observation were prepared by pulverization treatment from the functional structures of the examples and the iron oxide fine particles-carrying silicalite of Comparative Example 1. The cross-section of each sample was observed using a transmission electron microscope (TEM) (TITAN G2 manufactured by FEI Company).

As a result, in the functional structure of each of the examples 1-2, the functional material was found to be present and held inside the framework composed of silicalite or zeolite. On the other hand, in the silicalite of Comparative Example 1, the functional material ($FeO_x$ fine particles) was found to be deposited only on the outer surface of the framework and not found present in the framework.

The functional structures of Examples 1 and 2 were subjected to cross-section cutting by use of focused ion beam (FIB) processing. The resulting cross-sections were subjected to elemental analysis by use of SEM (SU8020 manufactured by Hitachi High Technologies Co., Ltd.) and energy dispersive X-ray spectroscopy (EDX) (X-Max manufactured by Horiba, Ltd.). As a result, Fe element was detected from the inside of the framework.

The results of the cross-sectional observation by use of TEM and SEM/EDX revealed the existence of the iron oxide fine particles inside the framework.
(B) Average Inner Diameter of Channels of Framework and Average Particle Size of Functional Material Any 500 channels of the framework were selected in the TEM image taken during the cross-sectional observation performed for the above evaluation (A). The long diameter and the short diameter of each of the channels were measured. The measured values were averaged to calculate the inner diameter of each channel (N=500), and the calculated inner diameters were averaged as the average inner diameter $D_F$ of the channels of the framework. In a similar manner, any 500 functional material particles were also selected in the TEM image and each measured for the particle size (N=500). The measurements were averaged to determine the average particle size $D_C$ of the functional material. Table 1 shows the results.

Small angle X-ray scattering (SAXS) analysis was also performed to confirm the average particle size and the dispersed state of the functional material. The SAXS measurement was carried out using the beamline BL19B2 of Spring-8. The resulting SAXS data were subjected to fitting by Guinier approximation method using a spherical model to determine the particle size. The particle size measurement was performed on the functional structure including the iron oxide fine particles as a metal oxide. For comparison, commercially available iron oxide fine particles (manufactured by Wako) were observed and measured using SEM.

The results were as follows. In the commercially available product, the iron oxide fine particles were found at random with different particle sizes in the range of about 50 nm to 400 nm. On the other hand, also as a result of the SAXS measurement, the scattering peaks for the particle sizes of 10 nm or less were detected from the functional structure of each of Examples 1 and 2 with the average particle size of 2.5 nm determined from the TEM image. The results of the SAXS measurement and the cross-sectional measurement using SEM/EDX revealed that the functional material had a narrow range of particle sizes of 10 nm or less and was extremely highly dispersed inside the framework.

The functional structures of Examples 1 and 2 were subjected to reduction treatment at 400° C. or more. As a result, the particles with sizes of 10 nm or less were maintained in each of the examples with the average particle size of 2.5 nm determined from the TEM image.
(C) Relationship between the Addition Amount of Metal-Containing Solution and the Content of Metal Included in Framework Functional structures having the metal oxide fine particles held and included inside the framework were prepared with an additional amount corresponding to a Si/M atomic ratio of 50, 100, 200, or 1000 (M=Fe). Subsequently, the functional structures prepared with the addition amount were measured for the content (mass %) of the metal held and included in the framework. For the measurement, the functional structures with a Si/M atomic ratio of 100, 200, or 1000 were prepared using the same process as for the functional structure of Example 1, except that the addition amount of the metal-containing solution was adjusted to different levels.

The method for quantitatively determining the metal content was performed using inductively coupled plasma (ICP) alone or a combination of ICP and X-ray fluorescence (XRF) analysis. XRF analysis (using energy dispersive X-ray fluorescence analyzer SEA1200VX manufactured by SII Nanotechnology Inc.) was carried out in a vacuum atmosphere under conditions at an acceleration voltage of 15 kV (using a Cr filter) or an acceleration voltage of 50 kV (using a Pb filter).

XRF is a method for determining the metal content by the fluorescence intensity, and XRF alone cannot quantitatively determine the metal content (in terms of mass %). Therefore, ICP analysis was used to quantify the content of metal in the functional structure containing metal in such an amount that the Si/M atomic ratio was 100, and the result of XRF measurement and the result of ICPO measurement were used to determine the content of metal in the functional structure containing metal in such an amount that the Si/M atomic ratio was 50 or less than 100.

The results revealed that, at least in the Si/M atomic ratio range of 50 to 1000, the content of the metal included in the functional structure increased with increasing the addition amount of the metal-containing solution.

(D) Existence Ratio of Metal Element (M) Forming a Coordination Structure of Four-Coordination Number Fluorescence yield XAFS measurement of the Fe—K absorption edge was performed using the Lytle detector of BL08B2 at Spring-8. Fe-substituted framework zeolite and α-Fe$_2$O$_3$ were used as the reference materials, the linear coupling of least squares using Microsoft Excel® Solver was performed to separate the peaks in the resulting XANES spectrum, and the area of the peak derived from the coordination structure of four-coordination number and the area of the peak derived from the coordination structure of six-coordination number were calculated to calculate the concentration of the metal element forming the coordination structure of four-coordination number by Formula (1) shown above. As a result, the metal element forming the coordination structure of four-coordination number was found in each of the functional structures of Examples 1 and 2, and the partial substitution was found between the metal element originating from the functional material and the element constituting the support.

(E) Performance Evaluation

The functional structures of the examples and the silicalite of the comparative example were evaluated for the catalytic ability (performance) of the functional material (catalytic material). Table 1 shows the results.

(1) Catalytic Activity

The catalytic activity was evaluated under the conditions shown below. First, an atmospheric pressure flow reactor was filled with 0.2 g of the functional structure. While nitrogen gas (N$_2$) was used as a carrier gas (5 mL/min), the decomposition reaction of butylbenzene (as a model material for heavy oil) was performed at 400° C. for 2 hours.

After the completion of the reaction, the generated gas and the generated liquid that were collected were subjected to component analysis using gas chromatography (GC) or gas chromatography-mass spectrometry (GC/MS). The generated gas was analyzed using TRACE 1310GC (manufactured by Thermo Fisher Scientific Inc., detector: thermal conductivity detector). The generated liquid was analyzed using TRACE DSQ (manufactured by Thermo Fisher Scientific Inc., detector: mass detector, ionization method: electron ionization (EI) with ion source temperature of 250° C. and MS transfer line temperature of 320° C., detector: thermal conductivity detector).

The yield (mol %) of the compounds with molecular weights lower than that of butylbenzene, such as benzene, toluene, ethylbenzene, styrene, cumene, methane, ethane, ethylene, propane, propylene, butane, and butene, was determined based on the results of the component analysis. The yield of the compounds was calculated as the percentage (mol %) of the total amount (mol) of the compounds with molecular weights lower than that of butylbenzene in the generated liquid relative to the amount (mol) of butylbenzene before the start of the reaction.

Regarding the catalytic activity in the examples, the generated liquid containing 20 C-mol % or more yield of the compounds with molecular weights lower than that of butylbenzene was evaluated to indicate excellent catalytic activity (decomposition activity) (⊚), 10 C-mol % or more and less than 20 C-mol % yield to indicate good catalytic activity (○), 5 C-mol % or more and less than 10 C-mol % yield to indicate poor catalytic activity (Δ), and less than 5 C-mol % yield to indicate very poor (unacceptable) catalytic activity (x).

Regarding the catalytic selectivity, the generated gas containing the olefin content of 75 mol % or more was evaluated to indicate excellent catalytic selectivity (○), the olefin content of 50% or more and less than 75% to indicate poor catalytic selectivity (Δ), and the olefin content of less than 50% to indicate very poor catalytic selectivity (x).

For the catalyst structure that was evaluated the catalytic activity, the catalyst structure sample was subjected to analysis of the amount of carbon (the amount of produced coke) on the catalyst using a CHN elemental analyzer (CE-440 (trade name) manufactured by Exeter Analytical Inc.).

Regarding anti-coking, the coke content with respect to the total mass of the catalyst structure was measured and evaluated. Specifically, the coke content of less than 5 wt was evaluated to indicate excellent anti-coking (○), and the coke content of 5 wt. or more to indicate poor anti-coking (x).

TABLE 1

| | Conditions for production of functional structure | | | | | | | | |
|---|---|---|---|---|---|---|---|---|---|
| | Precursor material (A) | | Raw material for precursor material (A) | | | Conditions for hydrothermal treatment using precursor material (C) | | | |
| No. | Type | Pore size (nm) | Additive | Metal aqueous solution | Si/M | Type of structure-directing agent | Na/(OSDA + Na) ratio | pH | Time (h) |
| Example 1 | MOM-41 | 2.5 | 0-15 | Iron nitrate (III) nonahydrate | 100 | TPABr | 0.16 | 12 | 72 |
| Example 2 | | 2.5 | 0-15 | Iron nitrate (III) nonahydrate | 100 | | 0.16 | | |
| Comparative Example 1 | | | | | FeO$_x$/MFI | | | | |
| Comparative Example 2 | | | | | Fe-substituted zeolite | | | | |
| Comparative Example 3 | | | | | H$^+$-ZSM-5 | | | | |

TABLE 1-continued

| | | Functional structure | | | | | | | |
|---|---|---|---|---|---|---|---|---|---|
| | | Framework Zeolite-type compound | | Functional material | | Ratio of metal with | | | |
| | | | Average inner | Metal oxide fine particle | | co-ordination | Result of evaluation of butylbenzene | | |
| | | | diameter | | Average | structure | decomposition reaction | | |
| | Structure | $D_F$ channels (nm) | | Type | Particle Size $D_C$ (nm) | $D_C/D_F$ | of four-co-ordination number | Activity | Olefin selectivity | Coke Content | Comprehensive evaluation |
| Example 1 | MFI | 0.54 | | FeO$_x$ | 2.5 | 4.6 | 0.69 | ◎ | ○ | ○ | ○ |
| Example 2 | | | | | 2.5 | 4.6 | 0.00 | ○ | ○ | ○ | ○ |
| Comparative Example 1 | | | | | ≤50 | — | 0.00 | X | X | ○ | X |
| Comparative Example 2 | | | | | — | — | 1.00 | X | ○ | ○ | X |
| Comparative Example 3 | | | | | | | | ◎ | Δ | X | X |

Table 1 shows that the functional structures (Examples 1 and 2), found to hold the functional material inside the framework in the cross-sectional observation, have higher catalytic activity for the decomposition reaction of butylbenzene, higher olefin selectivity, and a higher ability to suppress the coke production than the functional structure (Comparative Example 1) having the functional material only deposited on the outer surface of the framework, than the framework (Comparative Example 2) with no functional material in which the chemical bonds in the framework was partially substituted with the Fe ions, or than the Fe-free ZSM-5 zeolite framework (Comparative Example 3).

(F) Consideration

Some reasons for the results will be considered below. The functional structure of Example 1, the functional structure of Comparative Example 1, and the framework of Comparative Example 3 were subjected to NH$_3$-TPD (temperature-programmed desorption) measurement (BELCAT II manufactured by MicrotracBEL Corporation). Specifically, each sample was pretreated by calcinated at 550° C. under helium stream, then cooled to 100° C., and then exposed to 1% NH$_3$ gas flow (with helium balance) to adsorb NH$_3$. Subsequently, the flowing gas was changed to helium, and the sample was heated at 5° C./minute to 650° C. The NH$_3$ desorbed during the heating was analyzed using a thermal conductivity detector, and the acidity was calculated based on the amount of the desorbed NH$_3$. Table 2 below shows the results of the evaluation of the acidity for l-peak and the acidity for h-peak in the NH$_3$-TPD measurement of the samples of Example 1 and Comparative Examples 1 and 3. In this regard, the l-peak is a peak derived from NH$_3$ adsorbed on and then desorbed from the weak acid sites, and the h-peak is a peak derived from NH$_3$ adsorbed on and then desorbed from the strong acid sites.

TABLE 2

| | Acidity (mmol/g) | |
|---|---|---|
| | l-peak | h-peak |
| Example 1 | 0.10 | 0.20 |
| Comparative Example 1 | 0.04 | 0.09 |

TABLE 2-continued

| | Acidity (mmol/g) | |
|---|---|---|
| | l-peak | h-peak |
| Comparative Example 3 | 0.13 | 0.26 |

In general, when a strongly acidic catalyst such as ZSM-5 of Comparative Example 3 is used, the hydrogen transfer reaction of the lower olefin is allowed to proceed so that the lower olefin is further converted into paraffins, which is accompanied by formation of coke. This may support that, in Comparative Example 3 (ZSM-5) with the highest acidity level, the lower olefin selectivity of the product is low and the coke content is high. In order to prevent such hydrogen transfer reaction, the acidic property should be reduced. Unfortunately, low acidic property such as those of the framework of Comparative Example 1 will cause the problem of a decrease in activity.

To address this problem, in the functional structure of Example 1 according to the present invention, the metal element (M) that has constituted the functional material is partially substituted with the element that constituted the supports. Therefore, the functional material or the support or both the functional material and the support of the functional structure in Example 1 is suggested to have the acidic property higher than those of the functional structure of Comparative Example 1 and lower than those of the framework of Comparative Example 3, and such acidic property is considered to provide, in a well-balanced manner, good activity and selectivity for lower olefin production and a coke production-suppressing ability.

(G) Use of MOR type Zeolite Framework

A functional structure was produced using the same process as in Example 1, except that no structure-directing agent was used, the Na/(Na+OSDA) ratio was 1.00, the pH of the aqueous solution of the mixture was changed to 13, and the hydrothermal treatment time was changed to 96 hours. The resulting functional structure has a framework of MOR type zeolite. TEM cross-sectional observation revealed that the functional material was present and held inside the framework constituting the zeolite of the functional structure. As a result of the cross-sectional elemental analysis using SEM, the Fe element was detected from the inside of the framework. In the functional structure, the framework had the channels with an average inner diameter of 0.60 nm, the functional material had an average particle size of 2.5 nm, and $D_C/D_F$ was 4.2, as determined using the TEM image similar to Examples 1 and 2. The particle size remained at 10 nm or less after the functional structure was subjected to reduction treatment at 400° C. or more. The functional structure had a ratio of the metal element forming the coordination structure of four-coordination number of 0.74 as measured similar to Examples 1 and 2, which showed that the metal element that had constituted the functional material was partially substituted with the element constituting the framework.

EXPLANATION OF REFERENCE NUMERALS

1: Functional structure
10: Framework
10a: Outer surface
11: Channel
11a: Pore
12: Enlarged pore portion
20: Functional material
30: Functional material
$D_C$: Average particle size
$D_F$: Average inner diameter
$D_E$: Inner diameter

The invention claimed is:

1. A functional structure comprising:
a plurality of supports defining a framework, each support including a zeolite-type compound comprising a first element; and
at least one functional material present in the framework and including a metal element (M), wherein
the framework has a porous structure including channels communicating with one another,
the functional material is present at least in a channel of the framework, and
the functional material is partially bonded to the framework by a bonding material present at an interface of the functional material and the framework, the bonding material comprising both the first element derived from the framework and the metal element (M) derived from the functional material.

2. The functional structure according to claim 1, wherein the metal element (M) exists as a central atom of two types of coordination structures in the functional material, a first type being a coordination structure of four-coordination number and a second type being a coordination structure of six-coordination number.

3. The functional structure according to claim 1, wherein a ratio of the number of the metal element (M) in the coordination structure of four-coordination number to the total number of the metal element (M) in the coordination structure of four-coordination number and the coordination structure of six-coordination number is 0.15 or more, by atomic ratio.

4. A functional structure comprising:
a plurality of supports defining a framework, each support including a zeolite-type compound comprising silicon; and
at least one functional material present in the framework and including a metal element (M), wherein
the framework has a porous structure including channels communicating with one another,
the functional material is present at least in a channel of the framework,
the metal element (M) exists in the functional structure as a central atom of two types of coordination structures in the functional material, a first type being a coordination structure of four-coordination number having a spectral pattern corresponding to a metallosilicate and a second type being a coordination structure of six-coordination number having a spectral pattern corresponding to a metal oxide,
the functional material is partially bonded to the framework by a metallosilicate present at an interface of the functional material and the framework, the metallosilicate comprising both silicon derived from the framework and the metal element (M) derived from the functional material, and
an existence ratio P of the metal element (M) forming a coordination structure of four-coordination number is 0.15 or more, the existence ratio P being calculated by substituting into the below formula value (a) representing a peak intensity of a metal element forming the coordination structure of four-coordination number (a metal element being in the functional structure and having a spectral pattern corresponding to metallosilicate) and value (b) representing a peak intensity of a metal element forming a coordination structure of six-coordination number (a metal element being in the functional structure and having a spectral pattern corresponding to a metal oxide before being reduced to metal), based on an X-ray absorption near edge structure (XANES) spectrum determined from an absorption edge of the metal in the functional structure measured by X-ray absorption fine structure (XAFS) measurement:

$$P=(a)/(a+b).$$

5. The functional structure according to claim 4, wherein the existence ratio P is 0.25 or more.

6. The functional structure according to claim 1, wherein the channels have any one of a one-dimensional pore, a two-dimensional pore, and a three-dimensional pore of a framework structure of the zeolite-type compound, and have an enlarged pore portion different from the one-dimensional pore, the two-dimensional pore, and the three-dimensional pore, and
the functional material is present at least in the enlarged pore portion.

7. The functional structure according to claim 6, wherein the enlarged pore portion connects a plurality of pores constituting any one of the one-dimensional pore, the two-dimensional pore, and the three-dimensional pore.

8. The functional structure according to claim 1, wherein the functional material comprises a catalytic material, and each of the supports carries at least one catalytic material.

9. The functional structure according to claim 8, wherein the catalytic material is in the form of a metal oxide particle.

10. The functional structure according to claim 9, wherein the metal oxide particle has an average particle size larger than an average inner diameter of the channels and equal to or smaller than an inner diameter of the enlarged pore portion.

11. The functional structure according to claim 9, wherein the metal element (M) of the metal oxide particle is included in an amount from 0.5 to 2.5 mass % with respect to the functional structure.

12. The functional structure according to claim 9, wherein the metal oxide particle has an average particle size of 0.1 nm to 50 nm.

13. The functional structure according to claim 9, wherein a ratio of the average particle size of the metal oxide particle to the average inner diameter of the channels is from 0.06 to 500.

14. The functional structure according to claim 1, wherein the channels have an average inner diameter of 0.1 nm to 1.5 nm.

15. The functional structure according to claim 1, further comprising at least one additional functional material held on an outer surface of the support.

16. The functional structure according to claim 15, wherein the content of at least one functional material present in the support is higher than the content of the at least one additional functional material held on the outer surface of the support.

17. The functional structure according to claim 1, wherein the zeolite-type compound is a silicate compound.

\* \* \* \* \*